United States Patent [19]

Milligan et al.

[11] 4,389,600
[45] Jun. 21, 1983

[54] TAPE MEDIA INTERLAYER TENSION CHECK

[75] Inventors: Charles A. Milligan, Cochise; Daniel J. Winarski, Pima, both of Ariz.

[73] Assignee: International Business Machines Corporation, Armonk, N.Y.

[21] Appl. No.: 315,113

[22] Filed: Oct. 26, 1981

[51] Int. Cl.³ .................... G11B 15/43; G11B 15/18
[52] U.S. Cl. ........................................ 318/6; 360/90; 242/179
[58] Field of Search ............... 360/90, 88, 92, 96.3, 360/55, 62; 318/5–11, 40, 48, 52, 282, 265, 463, 488, 490; 242/179, DIG. 1, 186–191

[56] References Cited
U.S. PATENT DOCUMENTS 3,917,190 11/1975 Richt ................................ 242/191

*Primary Examiner*—J. V. Truhe
*Assistant Examiner*—A. Evans
*Attorney, Agent, or Firm*—J. A. Pershon; H. F. Somermeyer

[57] ABSTRACT

Reels of magnetic tape used in a reel-to-reel drive system suffer from an inter-layer slip if the reel has gone through environmental changes. This slip will cause errors to occur in the reading of the tape, since a constant tension and velocity and an accurate position is required in the reel-to-reel drive. To check whether the tension of the tape needs to be refreshed, the end of the tape is firmly held while the hub is driven in a reverse direction against the firmly held end of the tape. A detected reverse rotation indicates an inter-layer slip condition. The tape tension must be refreshed by unreeling the tape and rereeling with the correct tension applied. The reel of tape is then ready for operation.

10 Claims, 3 Drawing Figures

TAPE MEDIA INTERLAYER TENSION CHECK

BACKGROUND OF THE INVENTION

This invention relates generally to a winding and reeling device for magnetic tape and more specifically to a detecting means adapted to impinge energy against the magnetic tape and responsive thereto to control the winding and reeling of the magnetic tape.

FIELD OF THE INVENTION

Present day tape drive systems use a reel-to-reel drive to move the magnetic tape back and forth past a transducing station. No mechanical buffering system such as a vacuum column or a dancer arm nor capstans are required to ensure that the correct tape tension is accomplished for good recording. In a reel-to-reel system, the magnetic tape is passed directly between a supply and a take-up reel. A tension transducer senses the amount of tension in the tape as it is being reeled between the two reels and controls the motor drive that is connected to each of the reels. The reel-to-reel system operates upon the assumption that the tape wound around each of the reels is at the correct tension and that there are no loose wraps between layers of the tape which would cause the reels to falter during the winding and reeling operation via interlayer slip. A tape motion control for a reel-to-reel drive is disclosed in U.S. Pat. No. 4,125,811 to Eige, et al. and assigned to the assignee of the present invention.

Severe environmental changes can cause the tape wound on a reel to expand and contract thereby changing the tension in the reel by causing loose wraps. When the drive attempts to rotate these loose wraps on the reel hub, interlayer slip results. Since it is unknown which reels suffered through an environmental disturbance, heretofore each reel would have to be assumed to contain loose wraps or wait until a misread occurs and then assume that the error was the cause of a loss of tension, velocity or position and thereby require a repeat of the operation.

It is, therefore, an object of the present invention to provide a process and apparatus for testing for the condition of the tape media upon a reel when first introduced into a tape drive system.

DESCRIPTION OF THE PRIOR ART

Prior to the present invention, either all tapes or at minimum all tapes suspected of having undergone an environmental change had their tension refreshed by placing the reel of tape in a drive system and completely rereeling the tape. The drive system, of course, must be set up to control the tension of the tape as it is being rereeled. In most instances since it is unknown what environmental situations occurred in the storage of the tape reels, all of the reels underwent a refresh operation.

It is, therefore, another object of the present invention to provide apparatus and a procedure for controlling the apparatus that tests for the tape tension condition of a reel of tape and control the tape drive such that only those tape reels that show an interlayer slip condition are rereeled to refresh the tension of the tape.

U.S. Pat. No. 3,936,877 issued on Feb. 3, 1976 and entitled "Tape Transport Apparatus for Cassette Type Tape Recorder" discloses a drive that is reported to have the function of eliminating the slack of magnetic tape between supply reel and take-up reel. In this patent when the tape is placed into the machine and set for a recording operation, the supply reel is rotated in a backward direction to eliminate the slack in the magnetic tape. The tensioned magnetic tape causes the take-up reel to rotate in the rewind direction. This rotation in the rewind direction is detected and causes a normal unreeling operation to take place. There is no showing in the patent of a method or apparatus for checking the condition of the reel of tape before proceeding to a recording operation. In the patent only the slack in the magnetic tape between the supply reel and the take-up reel is eliminated, slack which could cause a recording error in a reel-to-reel system.

SUMMARY OF THE INVENTION

In accordance with the present invention, apparatus and a procedure for testing for loose wraps in a reel of tape is given. Immediately upon loading the reel of tape into the drive system, and before the tape is unreeled, the end of the tape is firmly held and a rotational force is applied to the reel by the reel motor in the rewind direction against the held end of tape. If the tape on the reel is prone to interlayer slip, a burst of pulses are emitted by a tachometer connected to the reel motor signalling that the reel has rotated in the reverse direction. A tape tension refresh operation is then performed by rereeling the tape onto a reel under correct drive tension.

The apparatus in the tape drive for checking for the tension condition of the web of material such as the magnetic tape on a supply reel includes a reel support means for holding the reel containing the magnetic tape for rotation. Restraining means are included for holding the free end of the tape. First drive means provide a reversible rotation for the reel holding means. Sensing means are connected to the first drive means for generating signals representing the rotational speed and direction of the first drive means. The tape drive apparatus includes a take-up reel and a second drive means connected for reversibly rotating the take-up reel. Control means activate the first drive means to rotate the reel means in a rewind direction to apply a tension to the tape as held by the restraining means. The control means is responsive to the generated signals from the sensing means to control the first and second drive means. The generated signals are the result of the rotation of the supply reel even though the free end of the tape is firmly held. The control means rewinds the tape for a refresh of the tension condition of the web if the sensing means generates signals which represents a rotational movement of the reel holding means. The control means may signal that the tension of the tape media is correct and thereby signal that a normal unreeling operation for recording can take place.

Therefore, the process for controlling a tape drive system according to the present invention includes the steps of attaching a reel of tape to a means for rotating the tape, holding the free end of the tape from a rewind movement, rotating the reel in a rewind direction while the tape is held firm, sensing any rotation of the reel, and rereeling the web if a rotation of the reel is sensed, otherwise, performing a normal drive operation for reproducing the data to or from the tape media.

An object of the present invention, therefore, is to provide an enhanced tape drive apparatus and a method for controlling said apparatus.

Another object of this invention is to provide a unique method for overcoming the condition of a reel of tape by performing a test procedure prior to using the tape in a recording or reproducing procedure in a reel-to-reel tape drive.

Yet another object of this invention is to provide apparatus that tests the condition of a reel of tape for an interlayer slip tendency by applying a reverse drive to the reel of tape against a held end of the reel of tape and sensing any motion of the reel to identify the condition of the tape.

These and other objects of the present invention will become apparent to those skilled in the art as the description proceeds.

BRIEF DESCRIPTION OF THE DRAWING

The various novel features of this invention, along with the foregoing and other objects, as well as the invention itself both as to its organization and method of operation, may be fully understood from the following description of illustrated embodiments when read in conjunction with the accompanying drawing, wherein.

DESCRIPTION OF THE PREFERRED EMBODIMENT

Figure 1:
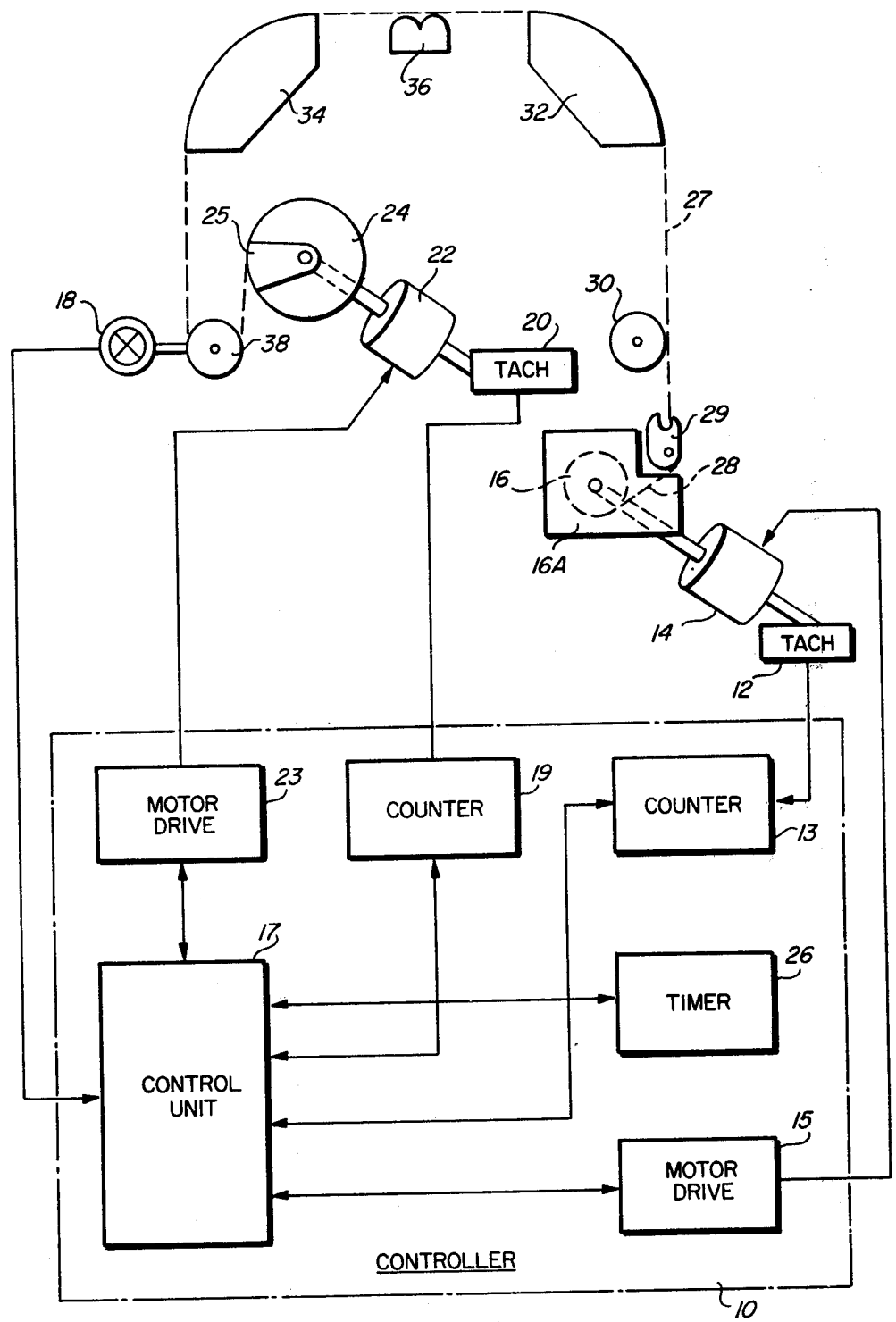
FIG. 1 is a pictorial representation of a tape drive and control for performing a process according to the present invention.

A pictorial representation of the tape drive in accordance with the present invention is shown in FIG. 1. Reference is made to the aforementioned U.S. Patent 4,125,881 to Eige, et al for a more complete description of a control circuit useable for a reel-to-reel tape drive. Only the apparatus and procedure for an understanding of the present invention is given herein.

As shown in FIG. 1, a controller 10 accepts information from a supply reel tachometer 12 which is connected to a supply reel motor 14. The supply reel motor 14 is driven by a motor drive circuit 15 to reversibly rotate a supply reel 16 shown located within a single reel cartridge 16A. The tachometer 12 directs count pulses to a counter 13 to indicate the number of rotations and the rotational position of the motor 14 and the supply reel 16. The output of the counter 13 is directed to a control unit 17. The count information from the supply reel tachometer 12 is used by the control unit 17 to perform the loose-tape wrap check operation according to the present invention. The control unit 17 also provides the control for keeping the required tension in the tape and thus the output from a tension arm transducer 18 is also directed to the control unit 17. Another input to the control unit 17 is via a counter 19 that accepts count pulses from a take-up reel tachometer 20. The tachometer 20 is connected to a take-up reel motor 22 that is reversibly driven by a motor drive 23 applied torque under control of the control unit 17. The motor 22 drives a take-up reel 24. A timer 26 is included in the controller 10 to control the application of the motor drive 15 power to the motor 14. The timer 26 is controlled by the control unit 17 in accordance with the present invention as will be discussed later.

A magnetic tape 28 takes a path, shown by a dotted line 27, from the supply reel 16 to the take-up reel 24 past an idler bearing 30, air bearing tape guides 32 and 34 and a magnetic head 36. The tape path 27 continues around an air bearing guide 38 of the tension arm transducer 18 to the take-up reel 24. Thus, for purposes of the present invention, the controller means 10, after the entry of a supply reel 16 onto the clutch drive (not shown), activates the motor 14 through the motor drive 15 and the control unit 17 into a reverse or reeling direction to first take up any slack in the tape 28 in the supply reel against a restraining means shown as a leader block 29, and then to apply a reverse higher current drive to the motor 14 for a period of time determined by timer 26 while checking the output of the tachometer 12 to sense any reverse rotation of the supply reel 16 against the tape 28 as held by the leader block 29. If the control unit 17 does not sense a sufficient number of count pulses from the tachometer 12 as stored in the counter 13, this means that the tape 18 on the supply reel 16 has not changed characteristics and is wrapped in a tight enough fashion to permit good operation of the reel-to-reel drive. If, however, the tachometer 12 sends out a sufficient number of count pulses signifying that the tape 28 on the supply reel 16 is not tight enough and the supply reel actually made a reverse motion against the end of the tape held by the leader block 29, the control unit 17 will direct a threading operation which will pull the leader block 29 and the tape 28 through the tape path 27 onto the take-up reel 24. The leader block 29 nestles in a cutout 25 in the take-up reel 24. The take-up reel motor 22 will be activated through motor drive 23 to unwind all of the tape 28 from the supply reel 16 under control of the control unit 17. When an end of tape is located by the controller 10 through a count of the number of turns that the tachometer 20 has sensed, the current to both motors 14 and 22 is reversed to unreel the tape 28 from the take-up reel 24 back to the supply reel 16. The tension of the wind of the tape 28 onto the supply reel 16 is controlled by the tension arm transducer 18 which controls the speed and rotation of the motors 14 and 22 through the controller 10. Thus, the tape 28 on the supply reel 16 is refreshed and is now ready for utilization in the reel-to-reel drive to either read or write magnetic transition information onto the magnetic tape 28. An example of a tape drive for threading a leader block and tape through a complex tape path is disclosed in the patent application Ser. No. 164,732 filed on June 30, 1980, entitled *Automatic Apparatus for Threading Tape over a Complex Tape Path Including a Continuous Channel Conforming to Said Path,* now U.S. patent No. 4,335,858 and assigned to the assignee of the present invention.

Figure 2:
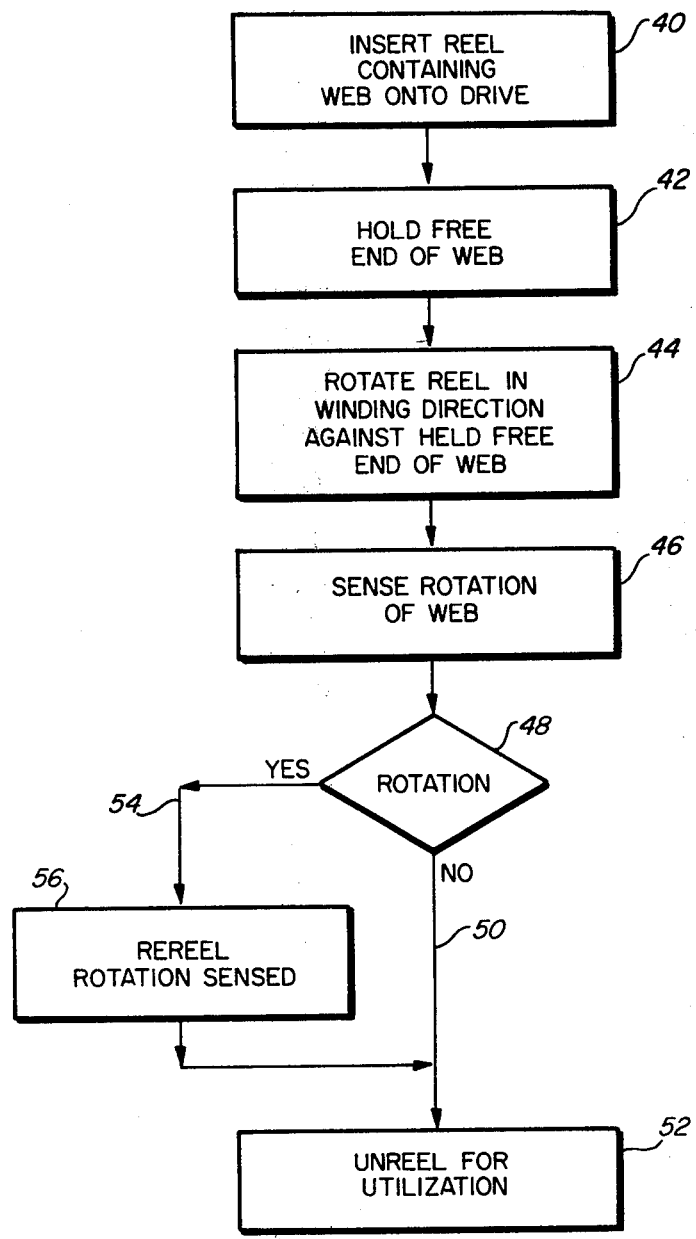
FIG. 2 is a flow chart showing the general process of the invention using the tape drive and control of FIG. 1.

A very generalized procedure flow chart is shown in FIG. 2. In discussing FIG. 2, the apparatus of FIG. 1 will be inserted for clarification of the steps. The first step in the procedure according to the present invention is to insert the supply reel 16 containing the web such as magnetic tape 28 into the tape drive such as shown in block 40 of FIG. 2. The next step in the procedure is shown in block 42 wherein the free end of the tape 28 is held against a reverse rotation. This is performed in FIG. 1 by the leader block 29 being held against entering the cartridge 16A. The next procedure shown in block 44 is where the controller 10 activates the motor 14 to rotate the supply reel 16 in the reverse direction against the held free end of the web. The next step such as shown in block 46 is where the controller 10 senses any reverse rotation of the supply reel 16 by way of the tachometer 12. The next procedure step shown in block 48 is the decision step where the rotation is checked. If there is not sufficient rotation, then the line 50 is taken in the procedure and the controller 10 activates the threading operation and the unreeling of the magnetic tape 28 from the supply reel 16 through the tape path 27 onto the take-up reel for utilization which is the sensing or writing of the magnetic transitions from the magnetic tape by way of the magnetic head 36.

If, however, a certain number of pulses is emitted by tachometer 12 and sensed by the controller 10, then the 'yes' path along line 54 is taken from the rotation decision block 48 to block 56. In block 56 the web is re-reeled because rotation has been sensed. In this procedure, the controller 10 activates the threading of the leader block 29 and the magnetic tape 28 along the tape path 27 into the take-up reel 24. The motor 22 is activated to completely unreel the magnetic tape 28 from the supply reel 16 onto the take-up reel 24. When the end of tape (EOT) is located, the controller 10 then activates the motor 14 and the motor 22 to perform a rereeling of the magnetic tape onto the supply reel 16 under the correct amount of tension as determined by the tension arm 18. After the magnetic tape 28 is completely returned to the supply reel 18, the magnetic tape is again unreeled for utilization in the tape drive as shown in block 52.

Figure 3:
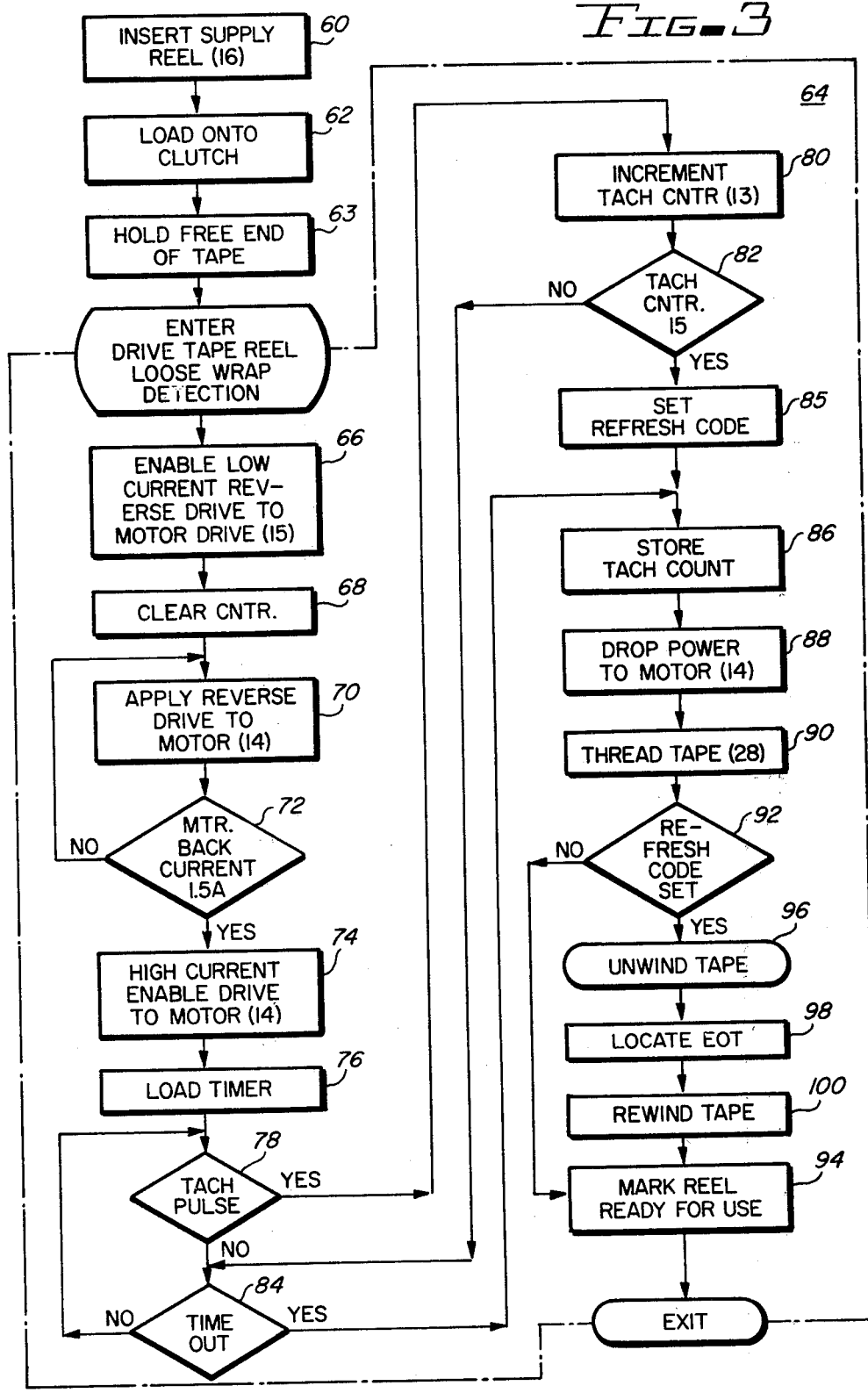
FIG. 3 is a flow chart showing the process of the invention giving more detail of the process according to FIG. 2.

The preferred procedural steps taken according to the present invention is shown in FIG. 3. Again, the steps taken by the procedure will be identified with the apparatus shown in FIG. 1 for clarification and identification of the general apparatus for performing this invention. The first step as shown in FIG. 3 is to insert the supply reel 16 into the tape drive such as identified in block 60. As shown in block 62, the supply reel is then loaded onto the clutch (not shown in FIG. 1). The free end of the tape 28 is then held against rotation by the leader block 29 as shown in block 63. Then the generalized procedure for the detection of the loose wrap of the supply reel 16 is shown within the dotted lines identified by the reference numeral 64. The loose wrap detection is performed on every tape reel entered into the tape drive system. The procedure is performed to identify any reels of magnetic tape that have undergone environmental changes that could cause the wraps of tape to unloosen. If a loose tape wrap is detected, then a refresh operation is required. The lack of integrity of the wraps of the tape onto the supply reel could cause an uneven feeling of the tape past the magnetic transducer since in a reel-to-reel tape drive, no capstans are used to specifically control the motion of the tape past the transducer. This problem is solved in the present invention by the checking procedures shown within the dotted section identified by reference numeral 64.

The first step in the process is to remove any slack from the tape 28 that may occur between the first layers of the tape and the leader block 29. This is performed as shown in block 66 where the low voltage reverse drive to the supply reel motor 14 is activated by the controller 10 through the motor drive 15 and the control unit 17. The low voltage is to ensure that no undue strain is placed against the tape 28 and the leader block 29 and to merely take up slack without causing a slip between the layers of tape in the supply reel. The next step as shown in block 68 is to clear the counter 13 in the controller 10. The counter 13 is cleared in preparation for the actual loose-wrap detection operation. The supply reel 16 is then driven backwards at a low velocity as shown in block 70. In block 72, the control unit 17 searches for a motor back current of an amplitude that would signify that all of the slack in the tape has been taken up. For the motor used in the preferred embodiment, a current of 1.5 amps is used for an indication that all of the slack in the tape has been removed.

The procedure then continues to block 74 where the high current reverse drive is enabled to the motor 14 by the motor drive 15 under control of the control unit 17. The timer 26 is loaded for a specific time-out as shown in block 76 to apply this high current drive for the loose-wrap detection operation to the motor 14. In a decision block 78 the count output pulses of the tachometer 12 is sensed and counted by the counter 13. If the tachometer 12 sends out count pulses, then the procedure branches to block 80 where these tachometer pulses are placed into the counter 13. The counter 13 had been previously cleared by the process as shown in block 68. The next step in the process is shown in block 82 where the decision is made whether the number of tachometer pulses in the counter is greater than fifteen. The number of tachometer pulses has been taken arbitrarily according to a set number which has been experimentally determined to be the best output count to check whether the tape on the supply reel needs a refresh operation. If the number of tachometer pulses is less than fifteen, the process branches to check whether the time has already passed for applying the high current reverse drive to the motor 14 as shown in decision block 84. If the time has not passed as determined by the timer 26 and the high current is continued to the motor 14, the process returns to continually check for output pulses from the tachometer 12 and to increment the tachometer counter 13 accordingly. If the counts in the tachometer counter never reach a count of fifteen and the period of time has passed, the process leaves the decision block 84 after a time-out by the timer 26 and into block 86 where the tachometer counts from counter 13 are stored by the control unit 17. This count of the tachometer pulses are only used if the tachometer counter 13 counted at least fifteen counts. Otherwise, if the time-out of the timer 26 has occurred and the counter 13 has not reached fifteen, the procedure will continue as shown in FIG. 3 with a standard operation. The next block 88 is where the motor drive 15 ceases applying the high current reverse drive to the motor 14 and the process exits the loose-wrap check and continues with threading of the tape as shown in block 90.

Since the refresh code has not been set, the procedure branch to block 94 from block 92 where the reel of tape is marked ready for use. The drive then utilizes the magnetic media in the usual manner and exits the refresh operation procedure. If, however, the loose-wrap detection procedure sensed that the tachometer 12 has emitted more than fifteen count pulses as counted by the counter 13, then the procedure exits from block 82 to block 85 to set a refresh code. The setting of a refresh code identifies that a refresh is required because the detection system has detected that the tape is too loosely wrapped for proper reel-to-reel drive operation. The tachometer count from counter 13 is then stored in the control unit 17 as shown in block 86 and the reverse rotation of the motor 14 is stopped. The next step in the process is shown in block 90 where the tape is threaded from the supply reel 16 onto the take-up reel 24.

After the magnetic tape 28 is threaded as shown in block 90, the next step in the process is to check whether the refresh code has been set as shown in the decision block 92. If the refresh code has not been set, meaning that the reel of magnetic tape is in good condition for sensing magnetic transitions, the supply reel 16 is marked as being ready for use as shown in block 94 and the procedure is exited where the unreeling of the tape continues while the magnetic transitions are sensed by the magnetic head 36 as stated previously. If, however, the refresh code had been set which indicates that the layers of tape are too loosely wound, then the procedure branches from the decision block 92 to the procedure block 96 where all of the tape 28 is unwound from the supply reel 16 and wound onto the take-up reel 24. When the end of the tape (EOT) is located as shown in block 98, the unwinding of the tape from the supply reel 16 is stopped and the tape is then rewound from the take-up reel 24 back onto the supply reel 16 as shown in block 100. The controller 10 controls the motors 14 and 22 according to the tension sensed by the tension arm transducer 18. Thus, the reel of tape is now ready for utilizing by the tape drive and the reel is then marked ready for use as shown in block in 94.

The principles of the present invention have now been made clear in an illustrative embodiment. There will be immediately obvious to those skilled in the art many modifications of structure, arrangement, proportions, the elements, materials and components used in the practice of the invention. For instance, it is obvious that many different types of tape paths could be used in the practice of the invention, the only requirement being is that it be a reel-to-reel type of drive.

A dual reel cartridge could be used with whatever reel that is full of tape being the supply reel 16, and the second, empty reel being the take-up reel 24. Further, if the head 36 and its associated circuitry were adapted to read and/or write in either direction, then a refresh reeling operation as shown in block 56 of FIG. 2 could be a single reeling from the supply reel 16 to the take-up reel 24. The utilization unreeling step of block 52 would then be from the take-up reel 24 to the supply reel 16.

Many different types of apparatus could be used for the tachometers 12 and 20 as well as for the tension arm transducer 18. These items are well known in the art including many different types of sensing arrangements such as optical and are well within the purview of the present invention. The type of counter and timing device used is likewise well within the skill of the practitioner and should not be taken to limit the present invention. Likewise, a reel of tape without a cartridge could be substituted for the cartridge 16A and the supply reel 16 together with any clamp acting as a restraining means that performs the procedure of holding the free end of the tape. The appended claims are, therefore, intended to cover and embrace any such modification, within the limits only of the true spirit and scope of the invention.

What is claimed is:

1. Apparatus for checking for interlayer slip of a coiled web of material comprising:
   a supply reel for holding a coil of a plurality of layers of the web of material;
   restraining means for holding the free end of the web of material;
   first drive means for reversibly rotating said supply reel in a direction to tighten the coil of the web of material;
   sensing means connected to said first drive means for generating signals representing the rotational displacement and direction of said first drive means;
   a take-up reel;
   second drive means connected to said take-up reel for reversibly rotating said take-up reel; and
   control means connected to said first and second drive means and to said sensing means for activating said first drive means to rotate said supply reel in said direction to tighten the web of material against said restraining means and having means responsive to the generated signals from said sensing means indicating a predetermined rotational displacement to control said first and second drive means to rereel the web of material to overcome interlayer slip.

2. An apparatus as defined in claim 1 wherein said sensing means is a tachometer generating pulses indicative of its rotation.

3. An apparatus as defined in claim 2 wherein said control means includes a counter for counting said tachometer generated pulses.

4. An apparatus as defined in claim 1 wherein said web of material is a magnetic tape.

5. An apparatus as defined in claim 1 wherein said web of material is a magnetic tape on a reel within a single reel cartridge and said restraining means is a leader block used to thread the magnetic tape to said take-up reel.

6. A machine-implemented process for checking the interlayer slip condition of a web of material coiled on a reel and having a free end;
   comprising the machine executed steps of:
   supporting a reel containing a coiled web on a means for rotating the reel in a first direction to tighten the coil;
   holding the free end of the web against any motion due to said rotation in a first direction of the reel to prevent winding the free end onto the reel;
   apply a torque to the reel in said first direction and against the held free end of the web;
   sensing and electrically indicating the resultant rotation of the reel caused by said applied torque; and
   unreeling and rereeling the web of material from and onto said reel if the electrically indicated rotation exceeds a predetermined magnitude, otherwise using the web of material without rereeling.

7. The machine-implemented process for checking the interlayer slip of a web of material coiled on a reel comprising the machine executed steps of:
   rotatably holding a reel containing a coiled web of material for checking its loose wrap condition;
   holding the free end of the web of material against any motion caused by a winding rotation of the reel which tends to tighten the coiled web of material while the reel has substantially all of said web of material coiled thereon;
   applying a rotating torque to the reel in the winding direction during said holding the free end of the web against motion;
   sensing any resultant rotation of the reel; and
   unreeling and rereeling the web of material off from and onto the reel if a predetermined rotation of the reel is sensed, otherwise marking the reel for utilization.

8. A machine-implemented process as defined in claim 7 wherein said step of unreeling and rereeling the web of material includes the step of:
   unwinding the web of material from the supply reel;
   winding the unreeled web of material onto a take-up reel; and rewinding the web of material onto the supply reel while holding the web of material under tension.

9. Apparatus for checking the potential interlayer slip of a coiled web of material having a free end at a radial outward extremity of the coil comprising:

a supply reel for holding a plurality of layers of the coiled web of material;

reel holding means for holding the reel for rotation;

restraining means for holding the free end of the web of material against motion caused a winding rotation;

first drive means coupled to the reel holding means for reversibly rotating said reel holding means;

sensing means connected to said first drive means for generating signals representative of the rotational displacement and direction of said first drive means;

a take-up reel;

second drive means connected to said take-up reel for reversibly rotating said take-up reel; and control means connected to said first and second drive means and to said sensing means for activating said first drive means to rotate said reel holding means to apply a torque to the reel and the web in a winding direction for urging the reel to rotate in a direction to tighten the coil of web material when said coiled magnetic tape is substantially coiled in the supply reel while said restraining means is holding said free end against motion caused by said applied torque and, means coupled to the sensing means for being responsive to the generated signals from said sensing means to control said first and second drive means in response to first predetermined generated signals supplied by said sensing means to rotate said take-up reel to unwrap the web of material from said supply reel and to wrap the web of material onto said take-up reel and to rewrap the web of material from said take-up reel back to said supply reel, or in response to second predetermined generated signals supplied by said sensing means to signal that insubstantial rotation occurred in said first drive means against said restraining means to control said first and second drive means for utilization of said web of material by predetermined transport thereof between said supply reel and said take-up reel.

10. Apparatus for checking for interlayer slip of layers of a coiled magnetic tape said tape having a free end with an enlarged leader block attached thereto, said leader block being fastened to a free end of the magnetic tape for pulling the magnetic tape through a predetermined tape path when connected to a threading means, comprising:

a cartridge having a tape opening for admitting the tape but not said leader block;

a single supply reel mounted for rotation in said cartridge and containing a plurality of layers of the coiled magnetic tape;

first drive means coupled to the cartridge for reversibly rotating said supply reel;

sensing means connected to said first drive means for generating signals representing the rotational displacement and direction of said first drive means;

a take-up reel;

second drive means connected to said take-up reel for reversibly rotating said take-up reel; and control means connected to said first and second drive means and to said sensing means for activating said first drive means to torque said supply reel for rotation in a winding direction when said coiled magnetic tape is substantially all in said supply reel and under a low current drive to remove any slack between the first outermost layer of magnetic tape and the leader block and then to torque said supply reel in a winding direction under a higher current drive to check for interlayer slip by checking rotational displacement of the supply reel against a held end of a magnetic tape by the leader block, said control means including a counter in said sensing means for counting said generated signals, said control means responsive to a preset count in said counter to control said first and second drive means to unreel the magnetic tape from said supply reel to said take-up reel and to rereel the magnetic tape from said take-up reel to said supply reel for establishing a relatively tight coil wrap condition of the magnetic tape to overcome interlayer slip during ensuing tape transport between said reels.

* * * * *